US009641218B2

(12) United States Patent
D'Amico et al.

(10) Patent No.: US 9,641,218 B2
(45) Date of Patent: *May 2, 2017

(54) TRACKING ASSET COMPUTING DEVICES

(71) Applicant: International Business Machines Corporation, Armonk, NY (US)

(72) Inventors: Alessio M. D'Amico, Rome (IT); Fausto Ribechini, Rome (IT); Patrizio Trinchini, Sulmona (IT); Massimo Villani, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/859,784

(22) Filed: Sep. 21, 2015

(65) Prior Publication Data

US 2016/0142099 A1 May 19, 2016

Related U.S. Application Data

(63) Continuation of application No. 14/541,535, filed on Nov. 14, 2014.

(51) Int. Cl.
*H04B 3/54* (2006.01)
*H04W 4/02* (2009.01)
*H04B 3/46* (2015.01)
*H04B 10/00* (2013.01)

(52) U.S. Cl.
CPC .............. *H04B 3/54* (2013.01); *H04B 3/46* (2013.01); *H04B 10/14* (2013.01); *H04W 4/027* (2013.01)

(58) Field of Classification Search
CPC ...... H04W 64/00; H04W 4/027; G01R 31/04; G01R 31/008; G01R 31/3025; H04M 1/00; H04M 9/00; H04B 3/54; H04B 3/46; H04B 10/14
See application file for complete search history.

(56) References Cited

U.S. PATENT DOCUMENTS

| 4,328,494 | A | * | 5/1982 | Goodall | B60C 23/009 177/136 |
| 5,936,919 | A | * | 8/1999 | Bates | G11B 7/08541 369/44.29 |
| 7,298,327 | B2 | | 11/2007 | Dupray et al. | |
| 7,397,424 | B2 | | 7/2008 | Houri | |
| 7,696,923 | B2 | | 4/2010 | Houri | |
| 8,255,107 | B2 | | 8/2012 | Yang et al. | |
| 8,271,189 | B2 | | 9/2012 | Garin | |

(Continued)

OTHER PUBLICATIONS

John R. Koch, Missouri S & T. Master Theses—A hybrid sensor network for watershed monitoring, 2008.*

(Continued)

*Primary Examiner* — Nizar Sivji
(74) *Attorney, Agent, or Firm* — Adolph C. Bohnstedt

(57) ABSTRACT

One or more processors send a signal from a first computing device to a second computing device through a hardwire connection. One or more processors determine a change between the signal as sent by the first computing device and the signal as received by the second computing device. The change is caused, at least in part, by the distance the signal travels. One or more processors determine a geo-location of the second computing device based, at least in part, on the change.

6 Claims, 5 Drawing Sheets

(56) References Cited

U.S. PATENT DOCUMENTS

| | | | |
|---|---|---|---|
| 8,374,632 B2 | 2/2013 | Ristich et al. | |
| 2002/0038153 A1* | 3/2002 | Amodeo | G08B 13/1418 700/1 |
| 2005/0041799 A1* | 2/2005 | Pythoud | H04B 3/46 379/400 |
| 2005/0049760 A1* | 3/2005 | Narayanaswami | G06F 1/3203 700/302 |
| 2005/0270377 A1* | 12/2005 | Liu | G08B 13/19619 348/207.99 |
| 2007/0167171 A1* | 7/2007 | Bishop | H04W 64/00 455/456.1 |
| 2010/0164519 A1* | 7/2010 | Sellathamby | G01R 1/07385 324/756.03 |
| 2011/0153235 A1* | 6/2011 | Thomas | G01R 31/024 702/59 |
| 2013/0141223 A1 | 6/2013 | Brandsma et al. | |
| 2015/0064939 A1* | 3/2015 | Rabinovitz | H01R 12/721 439/65 |
| 2016/0154761 A9* | 6/2016 | Reinke | G06F 1/185 710/301 |

OTHER PUBLICATIONS

Appendix P—List of IBM Patents or Patent Applications Treated as Related.

Andrews James, "Time Domain Reflectometry", provided by inventor on Oct. 13, 2014, pp. 1-6.

Broadbridge, "Power Line Modems and Networks", pp. 294-296, Nectar Electronics International Ltd, UK, provided by inventor on Oct. 13, 2014.

Manikandan et al., "Smart Fault Location for Smart Grids", International Journal of Software & Hardware Research in engineering, ISSN No. 2347-4890, vol. 2 Issue 3, Mar. 2014, pp. 10-13, Copyright 2014, IJOURNALS.

Meehan, "Enterprise GIS and the Smart Electric Grid", provided on the search report Jul. 15, 2014.

U.S. Appl. No. 14/541,535, Entitled "Tracking Asset Computing Devices", filed Nov. 14, 2014.

\* cited by examiner

TRACKING ASSET COMPUTING DEVICES

BACKGROUND OF THE INVENTION

The present invention relates generally to the field of asset management, and more particularly to asset device tracking.

Asset management, broadly defined, refers to any system that monitors and maintains things of value to an entity or group. Asset management is a systematic process of deploying, operating, maintaining, upgrading, and disposing of assets cost-effectively. Enterprise asset management (EAM) is the business processes and enabling information systems that support management of an organization's assets. An EAM requires an asset registry (inventory of assets and their attributes) combined with a computerized maintenance management system (CMMS). All public assets are interconnected and share proximity, and this connectivity is possible through the use of geographic information system (GIS), which allows for asset device tracking.

Organizations interested in tracking thousands or perhaps even millions of asset devices require economical and accurate ways of doing so. Thus, there is a continuing need for better methods to track such devices, especially if existing infrastructure can be used.

SUMMARY

Embodiments of the present invention provide a method, system, and program product for tracking asset computing devices. One or more processors send a signal from a first computing device to a second computing device through a hardwire connection. One or more processors determine a change between the signal as sent by the first computing device and the signal as received by the second computing device, wherein the change is caused, at least in part, by the distance the signal travels. One or more processors determine a geo-location of the second computing device based, at least in part, on the change.

DETAILED DESCRIPTION

Currently, global positioning system (GPS) tracking is a popular way of determining a device's geo-location. However, the cost of installing large numbers of GPS receivers on numerous asset devices can be prohibitive. One solution is to wirelessly transfer GPS data from surrounding GPS devices to a non-GPS device and determine the non-GPS device's geo-location via triangulation. However, wirelessly transferring GPS data from a GPS device to a non-GPS device allows for the introduction of significant errors in the transferred GPS data due to the inaccuracies present in the original GPS data points. For example, non-military GPS receivers typically have an error range of 10-15 meters. Determining the geo-location of a non-GPS device via triangulation from several GPS tracking receivers compounds the error ranges from each individual receiver. Thus, there is a need for new methods and infrastructure that will allow organizations to accurately track potentially an immense number of asset devices economically.

Embodiments of the present invention recognize that devices without a GPS receiver are challenging to track. Embodiments of the present invention recognize that there is a prohibitive cost associated with incorporating GPS receivers into a huge number of asset devices in order for organizations to track them. Embodiments of the present invention recognize that wireless acquisition of geo-location data from computing devices with GPS to non-GPS devices will compound inherent error already present in the GPS data. Embodiments of the present invention provide an economical method and infrastructure to track numerous non-GPS asset devices.

The present invention will now be described in detail with reference to the Figures.

Figure 1:
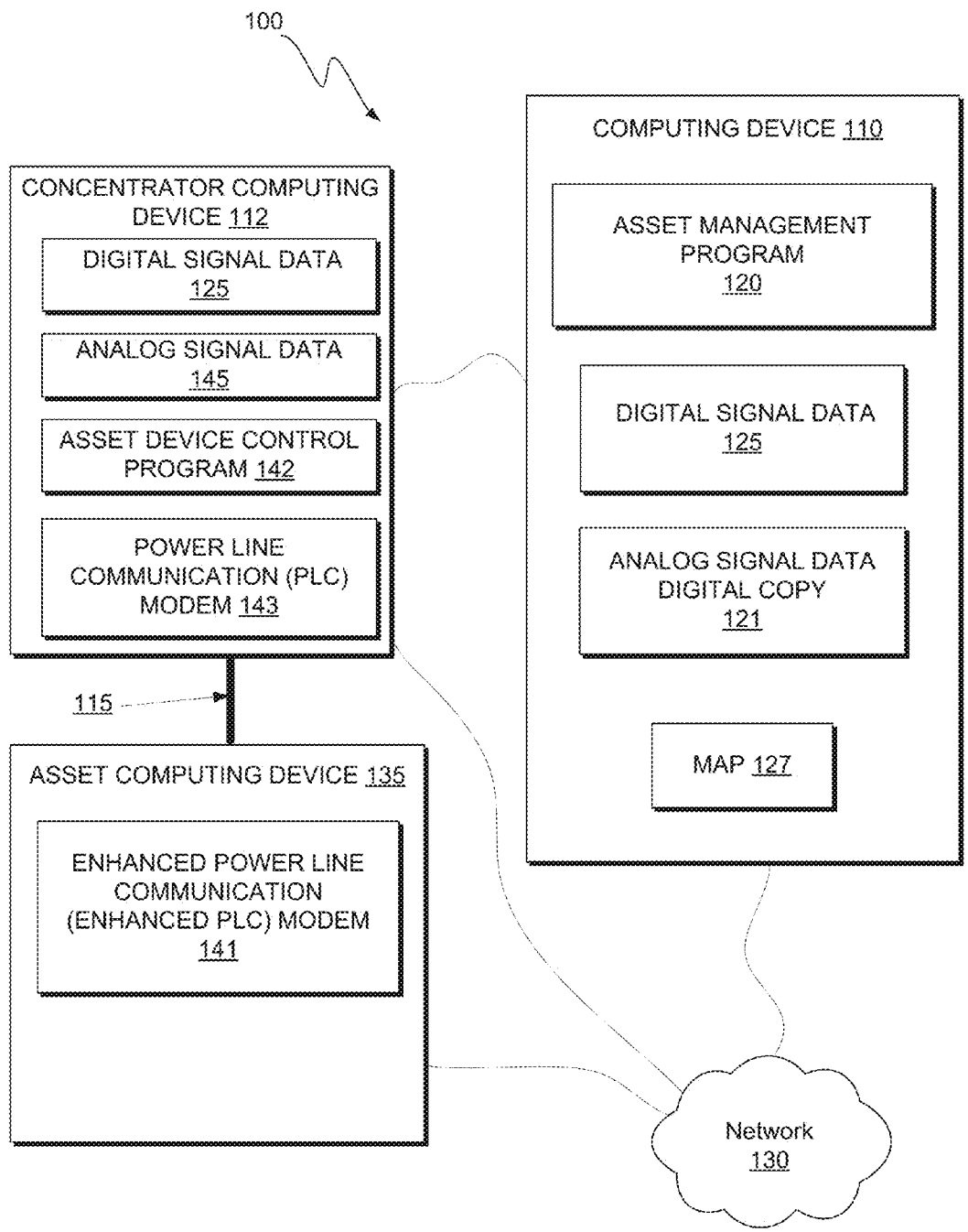
FIG. 1 is a functional block diagram illustrating an asset computing device tracking environment, in accordance with an exemplary embodiment of the present invention.

FIG. 1 is a functional block diagram illustrating an asset device tracking environment, generally designated 100, in accordance with one embodiment of the present invention. Asset device tracking environment 100 includes asset computing device 135, wiring 115, concentrator computing device 112, and computing device 110 connected over network 130. Asset computing device 135 includes enhanced power line communication (enhanced PLC) modem 141. Concentrator computing device 112 includes asset device control program 142, power line communication (PLC) modem 143, analog signal data 145, and digital signal data 125. Computing device 110 includes asset management program 120, digital signal data 125, analog signal data digital copy 121, and map 127. In embodiments, asset computing device 135, concentrator computing device 112, and computing device 110 include logic and computer programming that, when executed, is configured to cause one or all of asset computing device 135, concentrator computing device 112, and computing device 110 to carry out at least some of the processes shown in FIGS. 2-4 as described herein.

In an exemplary embodiment, asset computing device 135 is a device that, when connected to concentrator computing device 112 through wiring 115, will convert an analog signal sent through wiring 115 from concentrator computing device 112 to digital signal data 125 using enhanced PLC 141. Digital signal data 125 is then sent back to concentrator computing device 112. In this embodiment, enhanced PLC 141 includes: (i) a line driver that is connected directly to wiring 115; (ii) an analog front end to receive an analog signal sent by concentrator computing device 112; and (iii) a digital processing unit that converts the analog signal to digital signal data 125.

In an exemplary embodiment, wiring 115 is any hard wiring that will support the transfer of electromagnetic signals between asset computing device 135 and concentrator computing device 112 and allow bidirectional communication between asset computing device 135 and concentrator computing device 112. In one embodiment, wiring 115 is composed of an electrical conductor surrounded by a protective coating. For example, wiring 115 is a power cable or cord with a metal core such as copper surrounded by a sheath. In another embodiment, wiring 115 is a fiber-optic wiring assembly. In yet another embodiment, wiring 115 includes a plurality of hardwire portals capable of connecting with multiple asset computing devices 135.

In various embodiments of the present invention, concentrator computing device 112 is a receiver for signals from asset computing device 135 through wiring 115 wherein the concentrator computing device 112 geo-location is known. In one embodiment, the concentrator computing device 112 geo-location is determined by an attached GPS receiver. In another embodiment, the concentrator computing device 112 geo-location is previously mapped and known from map 127 and no GPS receiver is necessary. In various embodiments, concentrator computing device 112 is a receiver of signals from multiple asset computing devices 135 through wiring 115. For example, concentrator computing device 112 is located on a smart pole, telephone pole, street light, or building and connected to multiple asset devices through a grid.

In an exemplary embodiment, concentrator computing device 112 contains asset device control program 142, which broadcasts a signal to connected asset computing devices 135 to put the asset computing devices 135 in a localization mode. Analog signal data 145 is sent via PLC 143 through wiring 115 and digital signal data 125 is received in return. Digital signal data 125 is then used to calculate the geo-location of asset computing device 135. In an exemplary embodiment, concentrator computing device is a low voltage concentrator as found in power grid distribution network sub-stations.

Figure 5:
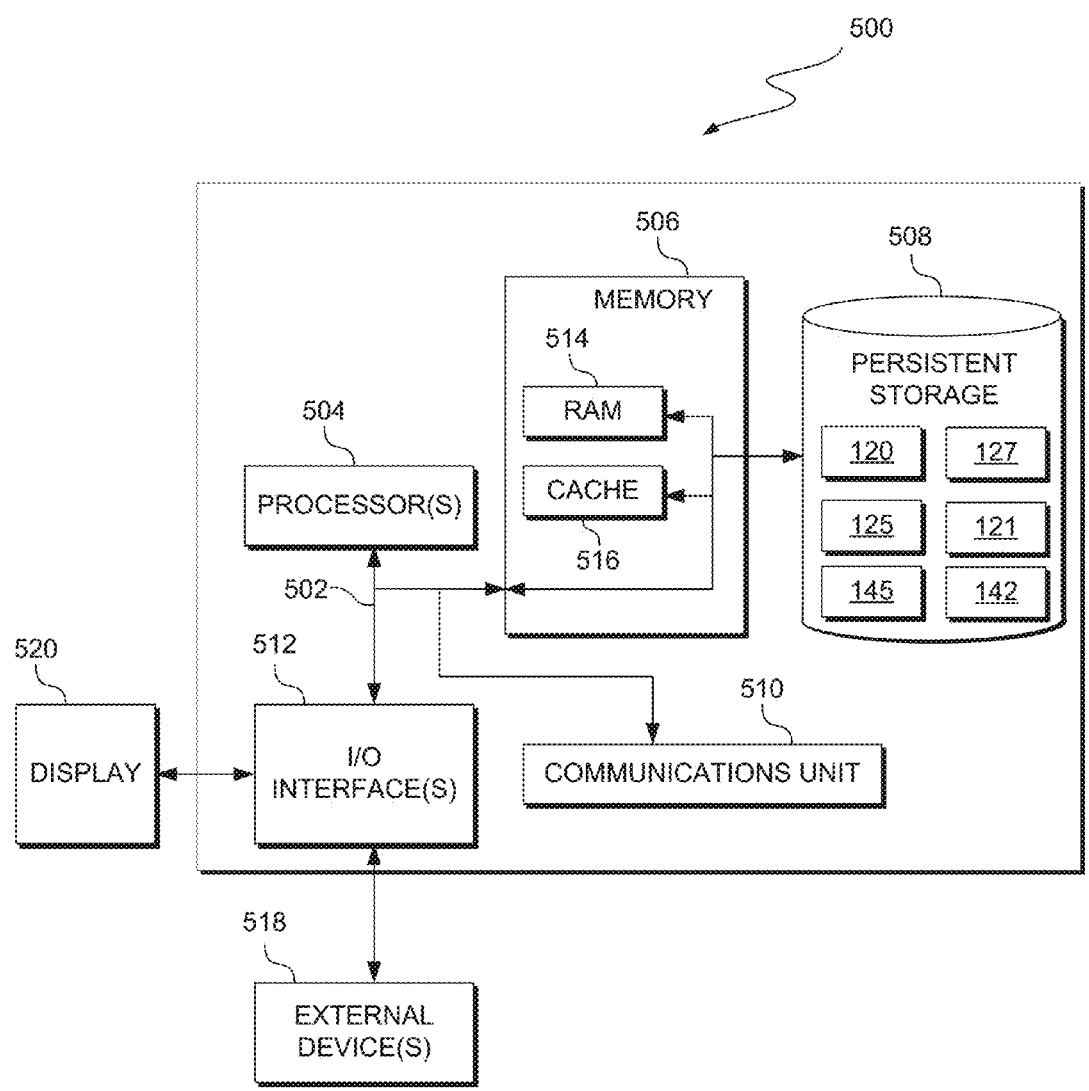
FIG. 5 depicts a block diagram of components of the concentrator computing device executing an asset device control program, the computing device executing an asset management program, and the asset computing device, in accordance with an exemplary embodiment of the present invention.

In some embodiments of the present invention, asset computing device 135 and concentrator computing device 112 include at least some internal and external hardware components, as depicted and described in further detail with respect to FIG. 5.

In various embodiments of the present invention, computing device 110 is a computing device that can be a standalone device, server, laptop computer, tablet computer, netbook computer, personal computer (PC), or desktop computer. In another embodiment, computing device 110 represents a computing system utilizing clustered computers and components to act as a single pool of seamless resources. In general, computing device 110 can be any computing device or a combination of devices with access to asset management program 120, digital signal data 125, analog signal data digital copy 121, and map 127 and is capable of executing asset management program 120. Computing device 110 may include internal and external hardware components, as depicted and described in further detail with respect to FIG. 5.

In this exemplary embodiment, asset management program 120, digital signal data 125, analog signal data digital copy 121, and map 127 are stored on computing device 110. However, in other embodiments, asset management program 120, digital signal data 125, analog signal data 145, and map 127 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between computing device 110, asset management program 120, digital signal data 125, analog signal data 145, and map 127 in accordance with a desired embodiment of the present invention.

Figure 2:
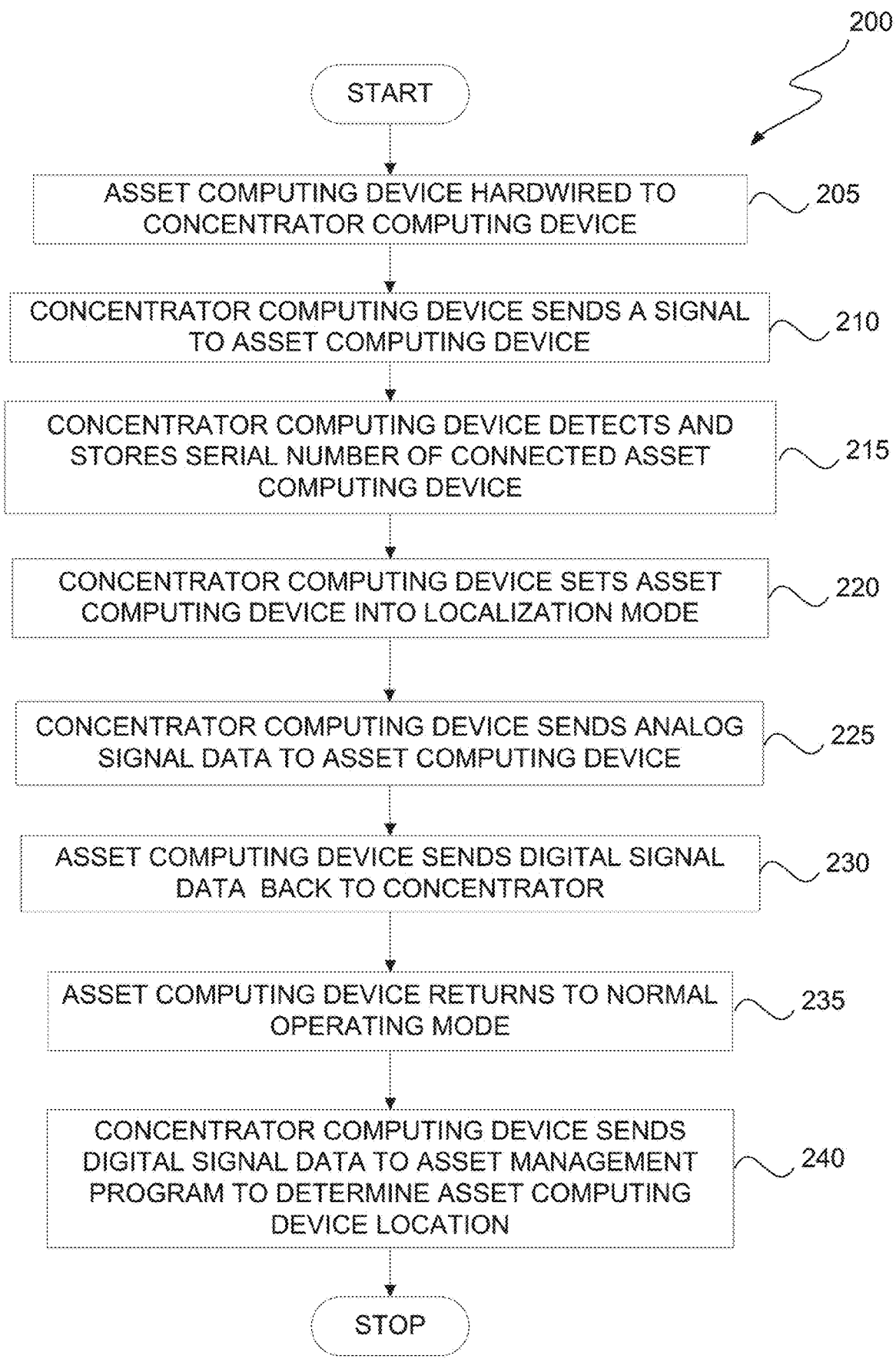
FIG. 2 illustrates operational processes of asset computing device tracking within the environment of FIG. 1, in accordance with an exemplary embodiment of the present invention.

FIG. 2 depicts operational processes, 200, for asset device tracking within the environment of FIG. 1 using asset device control program 142 and asset management program 120, in accordance with an exemplary embodiment of the present invention. In step 205, asset computing device 135 creates a connection with wiring 115 using firmware present in enhanced PLC 141. In an exemplary embodiment, wiring 115 includes a plurality of hardwire portals of individually distinct distances from concentrator computing device 112. Map 127 contains the geo-location of concentrator computing device 112 as well as the geo-location of all of the hardwire portals included in wiring 115. In step 210, concentrator computing device 112 sends a signal to asset computing device 135 commanding asset computing device 135 to identify itself. In step 215, asset device control program 142 of concentrator computing device 112 detects an identifier, such as a serial number, sent from asset computing device 135 in response to the signal and stores it in its memory (e.g., as part of data included in map 127). In step 220, concentrator computing device 112 sets the identified asset computing device 135 into localization mode by executing programming that is configured to do so, whereby asset computing device 135 is prepared to execute steps 225 and 230. In step 225, concentrator computing device 112 sends analog signal data 145 to asset computing device 135. In step 230, asset computing device 135 uses enhanced PLC modem 141 to convert the received analog signal from concentrator computing device 112 into digital signal data 125 and sends digital signal data 125 back to concentrator computing device 112. In step 235, asset computing device 135 ceases to be in localization mode and returns its state of activity that existed prior to step 220. In step 240, concentrator computing device 112 sends digital signal data 125 to computing device 110 to be used by asset management program 120 for comparison to a digital copy of concentrator computing device 112 analog signal data 145 that is unaffected by transmission (analog signal data digital copy 121).

In this exemplary embodiment, the analog signal data 145 is affected by traveling through wiring 115 in a way that indicates the distance analog signal data 145 has traveled. This effect is captured in digital signal data 125. In one embodiment, the signal propagation delay is the effect that allows the distance traveled by analog signal data 145 to be calculated as part of step 215. In another embodiment, the analog signal data 145 strength is attenuated as a function of distance traveled to become digital signal data 125 and the attenuation effect is captured.

In another embodiment, asset management program 120 applies one or both of: time domain reflectometry (TDR) and time domain transmissometry (TDT) simulations based on wiring 115 known parameters that are stored in the asset management software to calculate the distance traveled by analog signal data 145. TDR is a measurement technique used to determine the characteristics of electrical lines by observing reflected waveforms. TDT is an analogous technique that measures the transmitted (rather than reflected) impulse. Together, they provide a powerful means of analyzing electrical or optical transmission media such as coaxial cables and optical fibers. In this exemplary embodiment, the distance traveled becomes, in essence, a fingerprint of the hardwire portal of wiring 115 that is being used by asset computing device 135 as no two hardwire portals included in wiring 115 are the exact same distance away from concentrator computing device 112.

Figure 3:
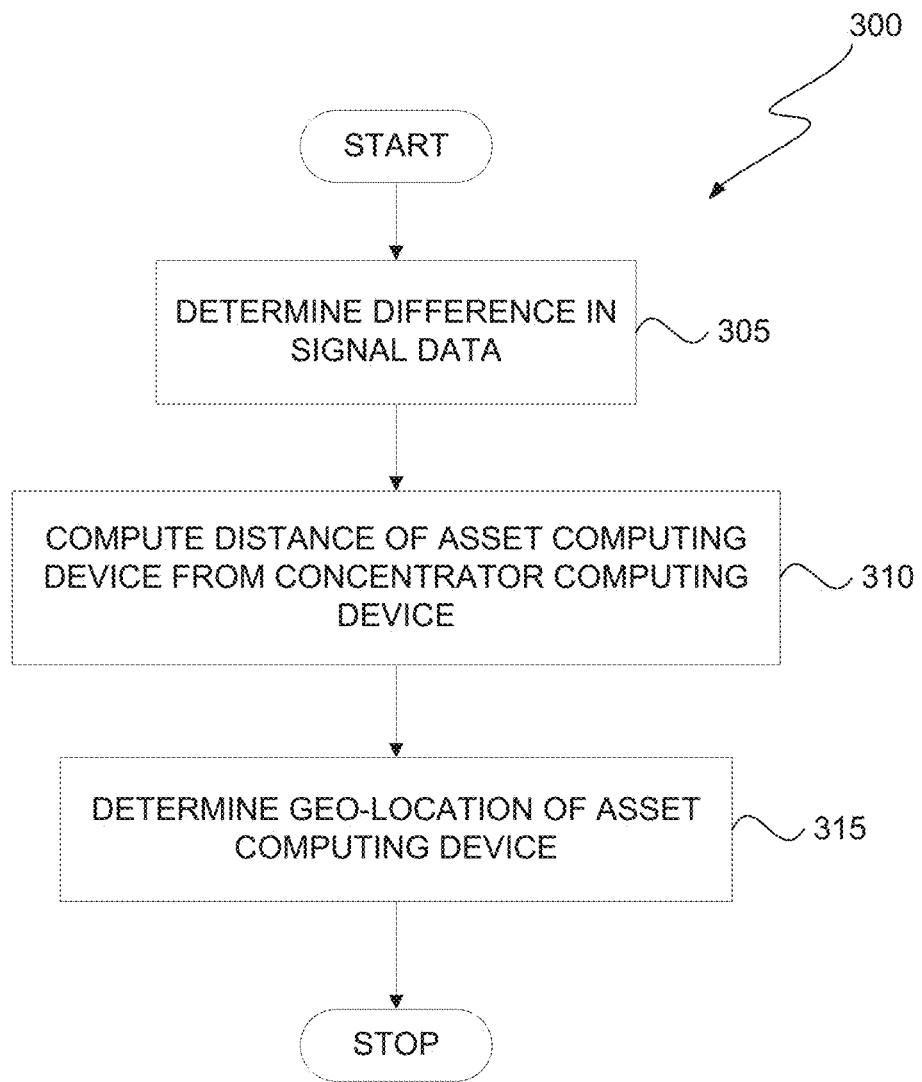
FIG. 3 illustrates operational processes of an asset management program within the environment of FIG. 1, in accordance with an exemplary embodiment of the present invention.

FIG. 3 illustrates operational processes, 300, of asset management program 120 within the environment of FIG. 1, in accordance with an exemplary embodiment of the present invention. In step 305, asset management program 120 determines how analog signal data 145 was affected by traveling through wiring 115 by comparison of digital signal data 125 with analog signal data digital copy 121. Analog signal data digital copy 121 is the digitized form of analog signal data 125 that is unmodulated by transmission effects. In one embodiment, the difference between analog signal data digital copy 121 and digital signal data 125 is due to the propagation delay of analog signal data 145 when traveling through wiring 115. In another embodiment, the difference between analog signal data digital copy 121 and digital signal data 125 is from loss of analog signal data 125 strength while traveling through wiring 115 due to signal attenuation.

For step 310, asset management program 120 computes the distance of asset computing device 135 from concentrator computing device 112 based on comparison of digital signal data 125 and analog signal data digital copy 121. In one embodiment, asset management program 120 applies TDR or TDT simulations incorporating wiring 115 line parameters as well as environmental parameters (like operating temperature). Asset management program 120 uses such simulations to generate estimates of the distance traveled by analog signal data 145.

In another embodiment, asset management program 120 uses the observed propagation delay to estimate the distance analog signal data 145 traveled. An electromagnetic signal's propagation delay is the length of time it takes for the signal to travel to its destination. This length of time depends on the material through which the signal travels and that material's permittivity. Permittivity is a material property that expresses the force between two point charges in the material. Relative permittivity ($\epsilon_r(\omega)$) is the factor by which the electric field between the charges is decreased or increased relative to vacuum and is defined by the following equation:

$$\varepsilon_r(\omega) = \frac{\varepsilon(\omega)}{\varepsilon_o} \quad (1)$$

Where $\epsilon(\omega)$ is the complex frequency-dependent absolute permittivity of the material and $\epsilon_o$ is the vacuum permittivity.

Determination of the relative permittivity for a wide range of frequencies allows the determination of velocity factors (VF) for a material:

$$VF = \frac{1}{\sqrt{\varepsilon_r(\omega)}} \quad (2)$$

Probing the material with a signal at a given frequency will produce a propagation delay, which is represented by a phase difference due to the fact that the material is not polarized instantaneously when subjected to the signal electromagnetic field. Determination of the velocity factor and propagation delay at a given frequency provides the distance the signal traveled (FIG. 3, step 310):

$$\text{distance} = c \times VF \times \text{propagation delay} \quad (3)$$

Where c is the speed of light in a vacuum. Determining propagation delays for a wide range of frequencies improves the accuracy of the estimate. The propagation delay will vary depending on the wiring 115 embodiment. For example, copper-based wiring will have a propagation delay reflecting the speed that electrons travel through copper. Other examples include glass and plastic optical fiber, which will have propagation delays reflecting the speed that light travels through glass and plastic polymers, respectively.

In another exemplary embodiment, asset management program 120 uses attenuation of the analog signal data 145 to determine the distance traveled by analog signal data 145. Attenuation is a general term that refers to any reduction in the strength of a signal. Sometimes called loss, attenuation is a natural consequence of signal transmission over distances. The extent of attenuation is usually expressed in units called decibels (dBs). If $P_o$ is the signal power at the transmitting end (origin) of a communications circuit and $P_d$ is the signal power at the receiving end (destination), then $P_o > P_d$. The power attenuation $A_p$ in decibels is given by the formula:

$$A_p = 10 \log_{10}(P_o/P_d) \quad (4)$$

In a different embodiment, attenuation is expressed in terms of voltage. If $A_v$ is the voltage attenuation in decibels, $V_o$ is the origin signal voltage, and $V_d$ is the destination signal voltage, then:

$$A_v = 20 \log_{10}(V_o/V_d) \quad (5)$$

In conventional and fiber optic cables, attenuation is specified in terms of the number of, for example, decibels per foot, per meter, per 1,000 feet, per kilometer, or per mile. Thus, in an embodiment of the operational processes of FIG. 3, asset management program 120 determines signal loss in dB of the analog signal data 145 after it travels from concentrator computing device 112 through wiring 115 (step 305), and then divides the loss by the specified or determined attenuation of wiring 115 for step 310.

Whether TDR/TDT simulations, propagation delay, attenuation, or some other distance determination method is used, step 315 determines the geo-location of asset computing device 135 by comparing the distance calculated in step 310 with the data on map 127. In this exemplary embodiment, map 127 includes the geo-location of all of the wiring 115 hardwire portals and the distance of the portals from concentrator computing device 112. As such, the distance calculated in step 310 corresponds to a single wiring 115 hardwire portal and its geo-location is therefore known.

Figure 4:
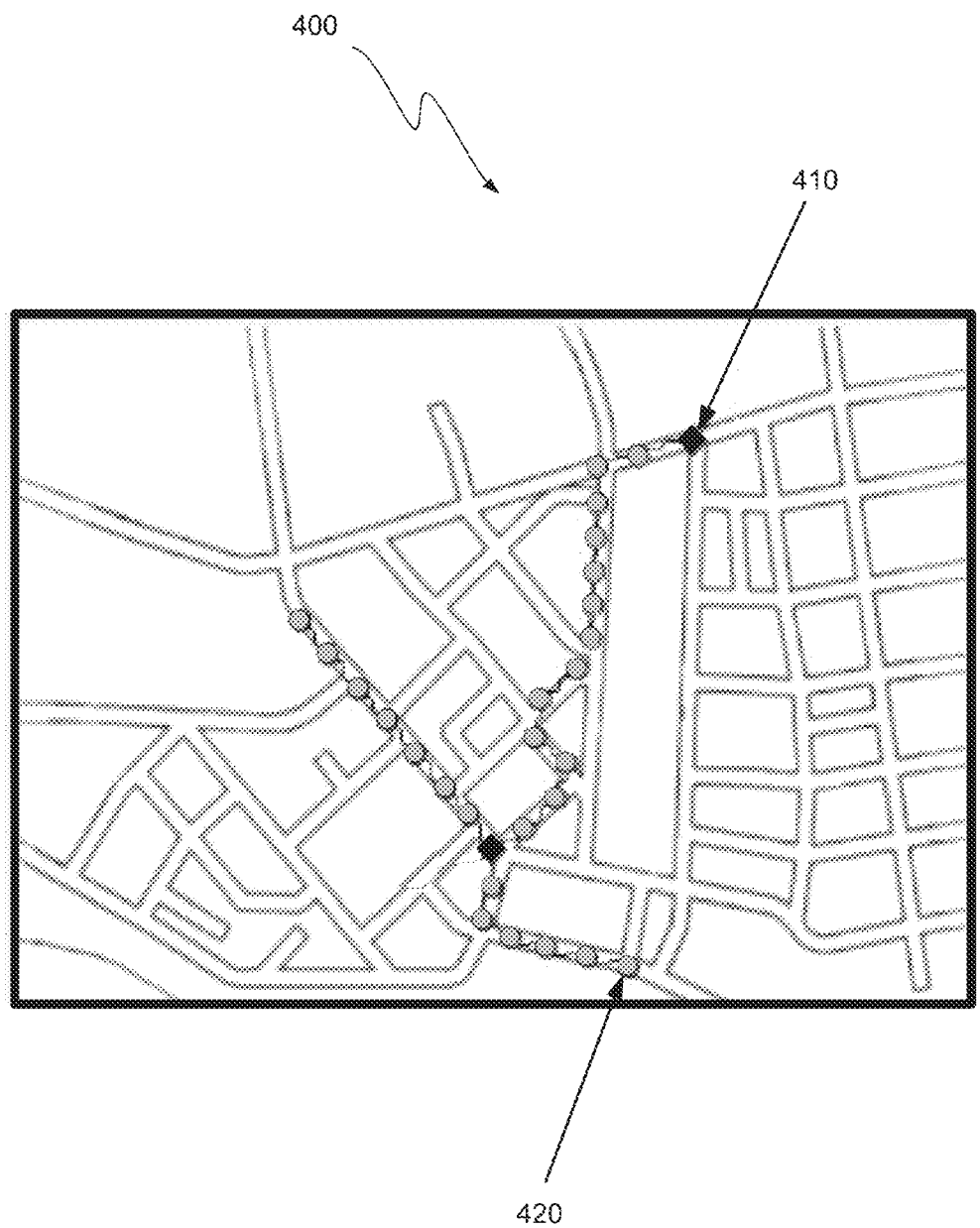
FIG. 4 depicts a street map visualizing an exemplary embodiment of the present invention.

FIG. 4 depicts a street map, 400, visualizing an exemplary embodiment of the present invention. In this embodiment, concentrator computing devices 112 (represented by black diamonds 410) exchange data and commands with asset computing devices 135 (represented by gray circles 420). The geo-location of all the asset computing devices 135 and concentrator computing devices 112 is known along with the wiring 115 distances between the asset computing devices 135 and concentrator computing devices 112. No two wiring 115 distances are the same for any asset computing device 135-concentrator computing device 112 pair within the asset computing device family of a given concentrator computing device 112. Concentrator computing devices 112 provide power to asset computing devices 135 and pass data obtained from these devices to computing device 110 and asset management program 120.

FIG. 5 depicts a block diagram, 500, of components of concentrator computing device 112 executing asset device control program 142, computing device 110 executing asset management program 120, and the asset computing device, in accordance with an exemplary embodiment of the present invention. It should be appreciated that FIG. 5 provides only an illustration of one implementation and does not imply any limitations with regard to the environments in which different embodiments may be implemented. Many modifications to the depicted environment may be made.

Computing device 110, concentrator computing device 112, and asset computing device 135 include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Digital signal data 125, analog signal data 145, asset device control program 142, analog signal data digital copy 121, map 127, and asset management program 120 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 130. In these examples, communications unit 510 includes one or more network interface cards. Communications unit 510 may provide communications through the use of either or both physical and wireless communications links. Digital signal data 125, analog signal data 145, asset device control program 142, analog signal data digital copy 121, map 127, and asset management program 120 may be downloaded to persistent storage 508 through communications unit 510.

I/O interface(s) 512 allows for input and output of data with other devices that may be connected to concentrator computing device 112 and computing device 110. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., Digital signal data 125, analog signal data 145, asset device control program 142, analog signal data digital copy 121, map 127, and asset management program 120, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method of tracking asset computing devices comprising:
    sending, by one or more processors, an analog signal from a first computing device to a second computing device through a hardwire connection;
    determining, by one or more processors, a change between the analog signal as sent by the first computing device and the analog signal as received by the second computing device, the change being caused, at least in part, by an attenuation of the analog signal caused by a distance the analog signal traveled through the hardwire connection; and
    determining, by one or more processors, a geo-location of the second computing device based, at least in part, on the change.

2. The method of claim 1, wherein the step of determining, by one or more processors, the change between the analog signal as sent by the first computing device and the analog signal as received by the second computing device, the change being caused, at least in part, by the distance the analog signal traveled further comprises:
    determining, by one or more processors, the change between the analog signal as sent by the first computing device and the analog signal as received by the second computing device, the change being caused, at least in part, by a propagation delay in the analog signal.

3. The method of claim 1 further comprising:
    applying, by one or more processors, one or both of time domain reflectometry and time domain missometry simulations to the hardwire connection to estimate, at least in part, the distance the analog signal traveled.

4. The method of claim 1, wherein the step of sending, by one or more processors, the analog signal from the first computing device to the second computing device through the hardwire connection further comprises:
    sending, by one or more processors, an electronic analog signal from the first computing device to the second computing device through the hardwire connection.

5. The method of claim 1, wherein the step of sending, by one or more processors, the analog signal from the first computing device to the second computing device through the hardwire connection further comprises:
    sending, by one or more processors, a light analog signal from the first computing device to the second computing device through the hardwire connection.

6. The method of claim 1, wherein the step of sending, by one or more processors, the analog signal from the first computing device to the second computing device through the hardwire connection further comprises:

sending, by one or more processors, the analog signal from the first computing device to the second computing device through the hardwire connection, wherein the first computing device is a low voltage concentrator.

* * * * *